(No Model.) 2 Sheets—Sheet 1.

LA VERNE W. NOYES.
BUNDLE CARRIER FOR GRAIN HARVESTERS.

No. 366,601. Patented July 12, 1887.

Witnesses:
Frank J. Blanchard
Chas. D. Burton

Inventor:
La Verne W. Noyes (No Model.) 2 Sheets—Sheet 2.

LA VERNE W. NOYES.
BUNDLE CARRIER FOR GRAIN HARVESTERS.

No. 366,601. Patented July 12, 1887.

Witnesses:
Frank S. Blanchard
A. G. Jackson

Inventor:
La Verne W. Noyes
By Chas. S. Burton
Attorney.

UNITED STATES PATENT OFFICE.

LA VERNE W. NOYES, OF CHICAGO, ILLINOIS.

BUNDLE-CARRIER FOR GRAIN-HARVESTERS.

SPECIFICATION forming part of Letters Patent No. 366,601, dated July 12, 1887.

Application filed February 15, 1886. Serial No. 191,934. (No model.)

*To all whom it may concern:*

Be it known that I, LA VERNE W. NOYES, a citizen of the United States, residing at Chicago, in the county of Cook and State of Illinois, have invented certain new and useful Improvements in Bundle-Carriers for Grain-Harvesters, which are fully described and explained in the following specification, in which it is shown applied to a self-binding harvester wherein the grain is bound standing on end.

Figure 1:
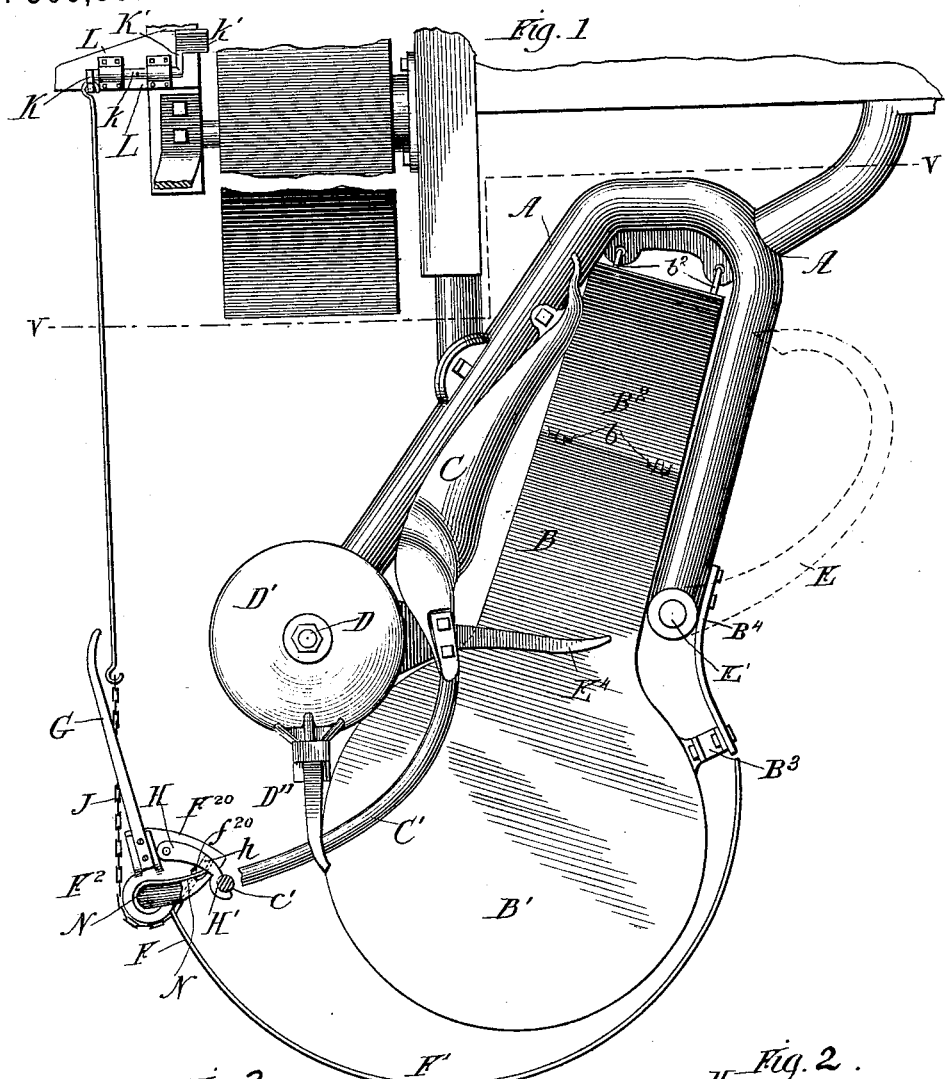
Figure 3:
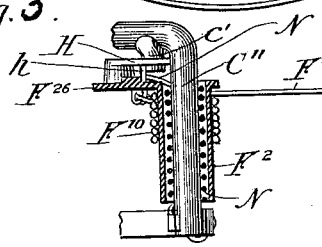
Figure 2:
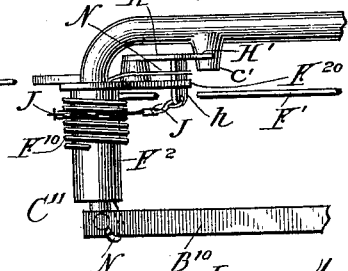
Figure 4:
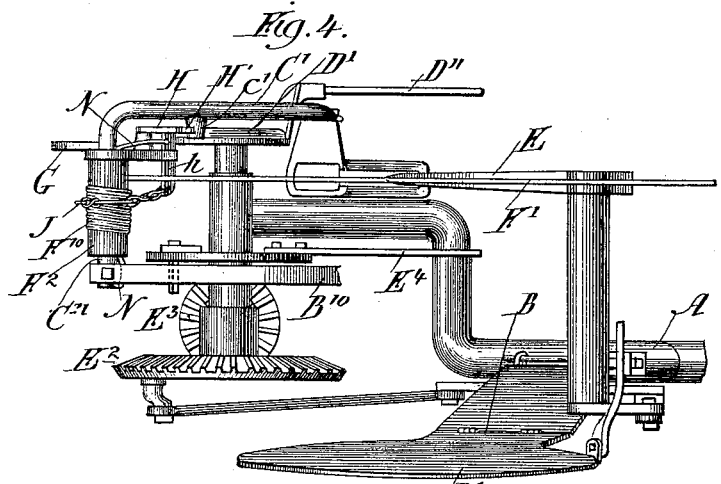
Figure 5:
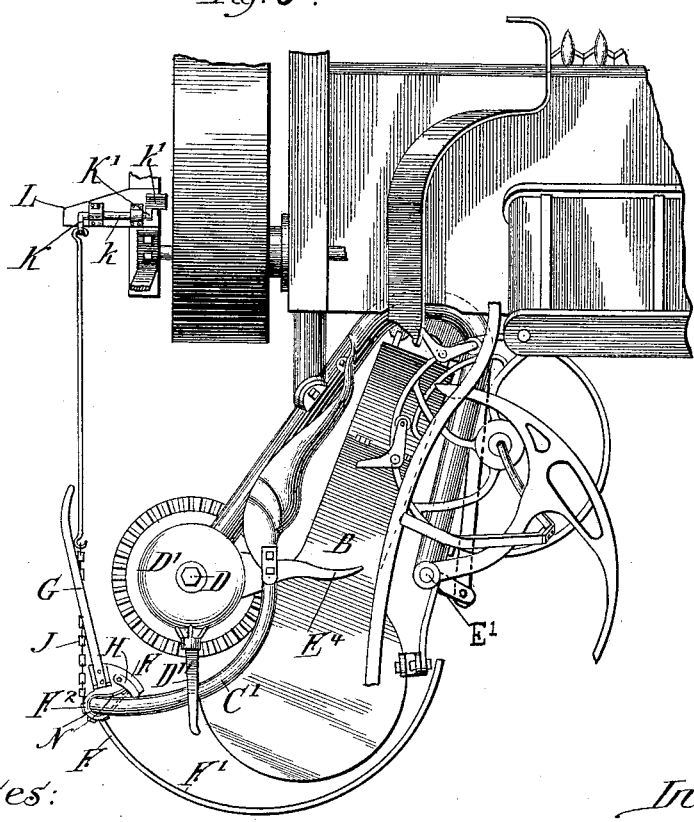

Figure 1 is a plan of the binder-frame and the bundle-carrier thereto attached. Fig. 2 is an elevation, parts not needed to illustrate this invention being omitted. Fig. 3 is a sectional detail, section being taken through the line $x\ x$, Fig. 1. Fig. 4 is a rear elevation omitting parts forward of the line $v\ v$ of Fig. 1. Fig. 5 is a plan of a harvester and binder having connected therewith my bundle-carrier, only enough of the harvester and binder being shown to indicate the path of the grain into the carrier.

A is the binder-frame.

B is the binder-floor or grain-support, which is suspended from the binder-frame in any convenient manner, as by the plate $B^2$, which supports the forward end, being hinged to the binder-frame at $b^2$ and to the floor B at $b'$, and by the link $b^3$, which supports the rear end, being connected to the rear part of the binder-frame, as by the arm $B^4$, bolted to said frame and having projected rearward, and having said link $B^3$ suspended from its rear end and connected at the lower end to the rear extension, $B'$, of the binder-floor.

C is the breast-plate; C', the bundle-stripper.

D is the knotter-actuating shaft; D', the knotter-actuating wheel thereon.

$E^2$ is a gear-wheel, also fixed on the shaft D, and through which said shaft receives motion.

$E^3$ is a pinion which transmits power to the wheel $E^2$.

$E^4$ is the trip-lever, operating by mechanism which bears no relation to the present invention, to effect and interrupt the connection of the pinion $E^3$ with its shaft, for the familiar purpose of giving intermittent motion to the binder mechanism.

E is the binder-arm. E' is its shaft.

D" is the discharger secured to the knotter-actuating wheel D'.

F is the bundle-carrier, comprising the arm F', secured to the hub or sleeve $F^2$, which is journaled on the vertical extension C" of the bundle-stripper C'. In order to make the arm F' yielding, it is made of iron rod and coiled several times around the hub $F^2$ from the point where it is fastened thereto, thus making of its attached end a torsion-spring, $F^{10}$. The lower end of the arm C" of the bundle-stripper joins the horizontal arm $B^{10}$, extended from the frame, thus being made rigid with and as a part of the frame A. The arm $B^{10}$ has the same curvature as the arm C', and hence is hidden by the latter in all plan views.

The upper end of the hub $F^2$ has the irregular flange $F^{20}$, to which is secured the carrier-discharger G, and upon which is pivoted also the latch H. This latch has a tooth, $h$, protruding down through a slot, $f^{20}$, in the flange $F^{20}$, by which—that is, by the ends of said slot—the play of the latch on its pivot is limited. The latch H has the hooked end H', which engages the stop $c'$ on the frame—that is, on the stripper C', which is a part of the frame. The said hook H' is formed to engage both sides of the stop $c'$, and, when engaged, to prevent rotation of the hub $F^2$ in either direction.

J is a cable or chain attached to the latch H, most conveniently being fastened to the lower end of the tooth $h$ below the flange $F^{20}$, and passing around or over the hub $F^2$, and thence forward to the lever K, pivoted on the seat-plank L. A convenient form of this lever is that illustrated, being a crank-arm of a short rock-shaft, K, which has another crank-arm, K', provided with the foot-rest $k'$, and designed to be pressed by the foot of the driver to actuate the carrier in emptying.

To the frame—the arm $B^{10}$—is fastened the spring N, which, for convenience, is coiled around the vertical arm $C^2$, inside the hub $F^2$, the latter being made large enough to inclose it, and at the upper end is made to engage behind the tooth $h$ of the latch H, tending both to force the latch in the direction to engage the stop $c$, and also as a torsion-spring to rotate the hub $F^2$ in the direction to carry the arm F' toward the binder.

The floor B is extended in the direction of the discharge of the bundle, said extension B' being enlarged laterally to afford space for supporting any desired number of bundles standing on end and leaning against the carrier-arm F', which overhangs the further boundary of the said floor-extension, or, when sprung back by the weight of a number of bundles leaning against it, is somewhat beyond the vertical line of the outer boundary of the floor-extension, B'. Said tension necessarily reaches beyond the scope of action or "sweep" of the discharger D'', which will push each successive bundle back against the preceding bundle as far as it retains its grasp or pressure behind them. When the desired number of bundles has accumulated on the carrier, the operator will communicate a longitudinal movement to the cable J, either by the means illustrated—viz., the rock-shaft and levers—or otherwise, and thereby first pull back the latch H and disengage it from the stop c, and then the latch itself being stopped by its tooth h reaching the end of the slot $f^{20}$, and becoming thus rigid with the hub, rotate the hub, as a windlass is rotated, by the cable around it and swing back the carrier-arm F', and allow the accumulated bundles to fall to the ground, which they will instantly do, since they are leaning against the carrier-arm, and, moreover, are leaning to the rear, so that the onward movement of the machine will both tend to accelerate their fall and when the heads touch the ground to cause them to withdraw from the floor, or rather to permit the floor to be withdrawn from under them without disarranging or dragging them, as might be the case if they had fallen sideward instead of rearward. In order, however, to insure perfect and prompt clearance of the carrier, I provide the carrier-discharger G, as described, which oscillates simultaneously with the carrier-arm F', following in behind the bundles which are to be dropped and sweeping them off the floor-extension. Said carrier-discharger necessarily revolves in the same direction as the binder-discharger D''. Moreover, it is preferably located nearly in the same plane, or, if there are two binder-dischargers, as is customary, between their planes, its sweep overlapping that of the binder-dischargers, so that it reaches forward and takes the last-formed bundle off the binder-discharger, and strips, also, any loose straw that may have become entangled between the stripper and binder-discharger. This carrier-discharger being located at rest behind the stripper C', and returning to that position by reversing its movement with the carrier-arm, when the load has been dropped, it is itself stripped of any loose straw by the same stripper, C', which strips the binder-discharger.

I claim—

1. In combination with the binder-frame, the carrier located at the discharge side thereof, means, substantially as described, for discharging the bundles thereinto from the binder, and an arm moving outward therefrom through the bundle-receiving space of the carrier to discharge the bundles from the latter, substantially as set forth.

2. In combination with the binder-frame, a carrier located at the discharge side thereof, the binder-discharger discharging the bundles into the carrier, and the carrier-discharger moving through the bundle-receiving space of the carrier to discharge the bundles therefrom, said dischargers moving in substantially parallel planes, the sweep of the carrier-discharger overlapping that of the binder-discharger, substantially as set forth.

3. In combination with the binder-frame, a carrier located at the discharge side thereof, the binder-discharger delivering the bundles into the carrier, and the carrier-discharger moving through the bundle-receiving space of the carrier to discharge the bundles therefrom, said dischargers moving in planes substantially parallel and about centers fixed with reference to each other, the length of each discharger being less and the sum of their lengths being greater than the distance between their centers, whereby the sweep of the latter overlaps that of the former and whereby they may operate in parallel and proximate planes without interference, substantially as set forth.

4. In combination with the binder-frame and the binder-discharger, the bundle-carrier located beyond the discharger in the direction of discharge, turning upon a pivot fixed with reference to the binder-frame, extending across the path of discharge and removable out of said path by turning in the same direction as the discharger, and a secondary or carrier discharger connected to the carrier and partaking of its movement, the sweep of said carrier-discharger overlapping that of the binder-discharger, substantially as set forth.

5. In combination with a binder in which the grain is bound standing on end, a floor to support the grain in the binder, an arm moving over such floor to remove the bundles therefrom, an extension of the binder-floor beyond the range of the discharging-arm, and the carrier on a vertical axis, said carrier located beyond and above the level of said floor-extension and removable out of the path of the discharger, substantially as set forth.

6. In combination with a binder which binds the grain standing on end, a floor to support the grain while being bound, an arm moving over said floor to remove the bundle therefrom, an extension of the binder-floor in the direction of discharge beyond the range of said arm, and the carrier on a vertical axis, said carrier located beyond said floor-extension and above its level, and the secondary or carrier discharger located above the level of the floor-extension, fixed on a vertical axis and oscillated thereabout over said extension simultaneously with the carrier, substantially as set forth.

7. In combination with a grain-binder discharging rearward, a carrier consisting of a bundle-guard located at the extreme rear beyond the binder-discharger, in the path of discharge, operated independently of the binder or its discharging mechanism and removable at will out of the path of discharge, and a secondary or carrier discharger sweeping rearward through the space immediately forward of said guard simultaneously with the withdrawal of said guard, substantially as set forth.

8. In combination, substantially as set forth, the hub having the carrier-arm and its rigid bearings, the latch pivoted on the hub and moving between stops thereon, the stop on the frame engaged by said latch, and the spring connected to the frame at one end and at the other end to the latch and thereby to the hub, whereby it serves the double purpose of actuating the latch to make it engage the stop on the frame and of rotating the hub to move its carrier-arm toward the binder.

9. In combination, substantially as set forth, the hub and its rigid bearings on the binder-frame, the spring-actuated latch pivoted on the hub eccentrically thereto and playing between stops thereon and engaging a stop on the frame, the cable connected to the latch and thereby to the hub and passing around the latter and longitudinally actuated at the other end, whereby said cable when so actuated first disengages the latch from the frame and then rotates the hub for the purpose of dumping the carrier by the same pull which releases the latch, substantially as set forth.

In testimony whereof I have hereunto set my hand, in the presence of two witnesses, at Chicago, Illinois, this 9th day of February, 1886.

LA VERNE W. NOYES.

Attest:
I. K. WEST,
CHAS. S. BURTON.